United States Patent Office 2,985,638
Patented May 23, 1961

2,985,638
SUSPENSION PROCESS FOR PRODUCTION OF POLYVINYL CHLORIDE

Percy W. Trotter, Baton Rouge, La., assignor to Ethyl Corporation, New York, N.Y., a corporation of Delaware No Drawing. Filed Apr. 29, 1957, Ser. No. 655,484

2 Claims. (Cl. 260—92.8)

This invention relates to the polymerization of halogenated monomers. More specifically, the invention relates to a new and improved proces for a highly efficient polymerization of vinyl chloride to provide a desirable homopolymer of vinyl chloride.

Polyvinyl chloride is a highly marketable material for the polymer molding and fabricating industry. This material is polymerized by various techniques, including solution polymerization, emulsion polymerization, and suspension polymerization. The suspension polymerization technique involves the polymerization of the monomer under pressure and in the presence of a substantial amount of water, at moderately elevated temperatures and with a substantial degree of agitation. The polymerization is conducted in the presence of an initiator, such as an oil soluble poroxygen compound, and various additives for facilitating the process, specifically wetting agents and colloids such as methyl cellulose or the like.

The technique and product generally described above have been reasonably satisfactory. However, it has now been realized that the actual polymerization employed heretofore has not been particularly effective in using the reaction equipment to the fullest and most effective extent. It has been the customary practice to conduct a polymerization at a more or less uniform or stable temperature, the temperature being varied according to the type of product desired. Thus, when a relatively low molecular weight product was wanted, the polymerization was conducted at a relatively elevated temperature, providing polymers particularly suited for the so-called "rigids." For higher molecular weight material, much lower temperatures are produced. The reason for conducting these polymerization operations in this fashion has arisen from the belief that relatively uniform product attributes necessitated maintaining the polymerization mass or system under substantially uniform conditions, particularly temperature conditions, throughout the duration of the polymerization run or process. Polymerizations have traditionally been carried out by batch techniques, and even with the present improved invention a batch operation is primarily contemplated as will be understood hereafter. Continuing the explanation of the apparent need for uniform temperature conditions, it was thought that in the physico-chemical sequence of polymerizing, the temperature was important from the very initiation of polymerization up to the termination of this polymerization. Hence, for example, a typical process, such as is generally described in U.S. Patent 2,528,469 calls for the polymerization at a temperature carefully maintained as uniform as feasible. In usual practice heretofore, the temperatures of polymerizations are normally maintained in the region of about 30 to 60° C., with temperatures of 45 to 55° C. being preferred and a particularly preferred range being 50 to 55° C.

The purpose of the present invention is to provide a new and improved method and technique for polymerizing vinyl chloride to obtain a desirable polymer product which is uniform in properties, relatively free of fish eyes, and has desirable processing characteristics, but nevertheless is produced at a higher production rate for a given reaction vessel or polymerization. A more specific object is to provide a planned polymerization schedule which circumvents the limitations and difficulties of prior methods. Other objects will be apparent from the detailed description given hereinafter.

Generally, the invention of the present process involves initiating a batch suspension polymerization reaction at an elevated temperature of 55 to 65° C. and thereafter decreasing this polymerization temperature in the course of polymerizing, adjusting said reaction temperature downwardly with time according to a pre-planned schedule. The temperature schedule provided involves a final polymerization temperature of 5 to 15° C. below the initial temperature. The intervening temperature history can include a gradual decrease or a series of several downward temperature adjustments can be provided which results in a similar, improved result. It would be expected that the slight differences in temperature required for the present invention would not materially benefit the production capacity of an installation, but on the other hand would seriously and adversely affect the qualities of the product so produced. It has, however, been discovered that this is not the case and that a high production of highly suitable material of predetermined attributes is realized. The process can be carried out to various degrees of completion, i.e., to various degrees of conversion, of the monomer initially charged, to polymer. Generally, for reasons hereafter disclosed in more detail, it is much preferred that the polymerization be terminated upon conversion of at least three-fourths of the monomer charged at least, a preferred by non-limiting degree of conversion being from about 85 percent to over 90 percent of the monomer charged.

Additional important factors of the process as disclosed include the employment of oil soluble peroxide polymerization catalysts, a water soluble synthetic emulsifying agent and a water soluble stabilizing hydrophilic colloid in certain proportion ranges. The degree of agitation provided during the polymerization operation is also quite important as will hereafter be seen. Generally, the reacting or polymerizing mixtures should be agitated such that a Pfaudler Agitative Intensity Factor (see Pfaudler Company, Rochester, New York, Reprint No. 508 by O. W. Green) of about 4 generally is attained, although a suitable range is from 2 to 6.

According to the present invention the process is carried out generally as follows. A polymerization charge is prepared containing vinyl chloride liquid monomer, deionized water, a per-oxy polymerization catalyst, an emulsifying agent, a stabilizing hydrophilic colloid, and this charge is formed in a suitable glass-lined reaction vessel.

The charge is heated to about 60°, or even slightly above, to as high as about 65° C. with agitation, to obtain uniform temperature conditions, during which time the polymerization begins. An elevated pressure is necessarily maintained on the vessel to prevent vaporization of the vinyl chloride monomer, some decrease in pressure being experienced during the process with decreases in the operating temperature.

After initiation of the polymerization, polymerization conditions are maintained for the time required for desired polymer yield. Generally, processing is continued until at least three-fourths of the monomer is converted to the homopolymer. Generally, a significant operating pressure decrease is experienced when approximately four-fifths, or slightly more, of the monomer is polymerized. The critical feature of the operation is the maintenance of a decreasing temperature history for the batch being processed. During the course of the reaction the average temperature is lowered either stepwise or uniformly, depending upon convenience, to provide a final period of polymerization at a temperature of about 5 to 15° C. below the starting temperature of operation. The precise manner of decreasing the temperature is not of great criticality and stepwise operation is frequently preferred for ease of control. As a result of the foregoing procedure, the processing time for a given batch can be reduced about 25 to 30 percent, or in other words the production capacity of a unit can be increased approximately 40 percent.

The precise details of operation will be more fully understood from the detailed examples and description given below.

Example I

A charge was fed to a glass-lined polymerization kettle of the following composition and proportions:

100 parts vinyl chloride monomer
225 parts deionized water
0.3 part lauroyl peroxide
0.12 part sodium dioctyl sulfosuccinate
0.07 part of methyl cellulose The reactor was fitted with appropriate openings, lines, and pressure and temperature measuring instruments.

In charging these materials to the reactor, all items except the catalyst and monomer were first added. Then the catalyst, and finally the monomer vinyl chloride were introduced and the reactor sealed. The charge was purged by application of a vacuum, followed by the application of a small positive vinyl chloride gas pressure. This purging operation was repeated several times. Liquid vinyl chloride was then charged and the reactor and contents were then heated to the desired initial reaction temperature by circulating hot water therethrough to provide a temperature of usually about 60° C. The heating is accompanied by agitation, the agitation being by means of propeller type agitators, top-mounted on the vessel and providing agitation to the extent of a Pfaudler agitative intensity factor of about 4.

During the increase to temperatures of the order of 60° polymerization started and the introduction of heat to the system was discontinued. The polymerization results in evolution of appreciable quantity of heat, and therefore substantial quantities of circulating cooling liquid or cooling water were used.

This polymerization was continued according to the following schedule:

3½ hours at 60° C.
1½ hours at 50° C.

In this sequence it is apparent that two major steps were provided, the reduction in temperature after the initial period of polymerization being accomplished by a drastic increase in flow of the cooling water in the vessel jacket.

The final temperature was held until the pressure fell 10 pounds per square inch, this pressure decrease corresponding to a polymerization of over four-fifths of the initial charge. The reactor was then vented to the atmosphere and concurrently cooled to room temperature leaving a suspension of readily settleable polymer particles in the water medium.

Treatment of this slurry or suspension was accomplished by feeding to a perforated bowl centrifuge and washing with a deionized wash water with about 0.15 percent disodium phosphate dissolved therein. The polymer granules thus isolated were dried by a tray drying operation to contain less than 0.5 percent moisture. A recovery of polymer corresponding to a conversion of 80.3 percent of the monomer charged was obtained.

Example II

The foregoing example describes a temperature reduction profile involving two major steps. The present example describes a temperature reduction profile which more nearly approximates a uniform temperature decrease.

In this example the same procedure as in Example I, with respect to charging and initial operation, was followed but the temperature profile provided was about as follows:

2 hours at 60° C.
1 hour at 58.5° C.
1 hour at 57° C.
45 minutes at 55° C.
45 minutes at 53.5° C.

Surprisingly this temperature history required a longer period to effect a similar degree of conversion as was obtained in Example I even though the average or integrated temperature of polymerization was somewhat higher than in the foregoing run.

The theoretical explanation of the benefits of the present process are not fully and clearly understood. It is believed that the polymerization reaction is to some undefined extent autocatalytic. In other words it appears that the polymerization of a minor portion of the monomer material initially present engenders and accelerates the polymerization of additional material as it is formed. It has been heretofore believed that a constant temperature of polymerization was essential to obtain products of predictable desirable attributes. Hence, elevated temperatures have been carefully avoided during all portions of a cycle. The present process utilizes the discovery that the use of a high temperature early in the polymerization is surprisingly not injurious to product properties. Accordingly, through the use of these higher temperatures during this normally slow period of the usual batch cycle, polymerization rates during this period can be made to approach, equal or possibly exceed the maximum rate which normally occurs just before the end of the polymerization. Thus, apparatus of given heat transfer capacity can be effectively utilized throughout an operating cycle instead of only at the end as is normally the case. The discovery that this can be done without adverse effect on polymer properties results in appreciable increases in capacity as shown by contrast of the foregoing examples with the following example illustrative of conventional procedures.

Example III

A charge identical to the charge employed in the foregoing examples was prepared and polymerized under the same conditions, except that the polymerization was carried out at a uniform temperature of 56° C. A processing time of about 7 hours was required for satisfactory conversion, or about 40 percent longer than, for example, the time required in Example I.

Example IV

As already described, if desired and convenient, the polymerization temperature, according to the present process, can be decreased at a substantially uniform rate, as follows. The procedure of Example I is repeated except that the temperature is decreased slowly, at a substantially uniform rate of about 2° C. per hour. Generally equivalent results are obtained.

As already indicated, the properties of the vinyl chloride homopolymer produced by the present process is quite satisfactory and fully as good, in numerous aspects, as the polymer made by a uniform temperature process (as in Example III) which requires about 40 percent longer processing time. The comparative data listed below show the full adequacy of the product obtained by the present invention.

|  | Polymer or resin from Example I | Polymer or resin from Example III |
|---|---|---|
| Heat stability, minutes to color.[1] | >120 | >120. |
| Particle size | 99% thru 40 mesh | 99% thru 40 mesh. |
| Quality of dry blend [2] | Satisfactory | Satisfactory. |
| Processability: [3] | | |
| 6 min | 0 | 2. |
| 8 min | 0 | 0. |
| 10 min | 0 | 0. |

[1] Determined by heating at 300° F. in a forced draft oven, a molded resin disc of the following composition: 100 parts resin, 50 parts dioctylphthalate, 3 parts dibutyl tin dilaurate.
[2] Measured as the ability of a dry blend prepared at a temperature of 80° C. to flow through a funnel according to ASTM procedure D302-38. Blend formulation was as follows: 100 parts resin, 50 parts dioctyl phthalate, 3 parts dibutyl tin dilaurate, and 0.5 part stearic acid.
[3] Measured as the average number of gel particles per square inch in a 6 square inch specimen 10 mils thick which was roller-milled at 300° F. with carbon black for the times specified.

From the foregoing property tabulation, it is seen that the product obtained by the present process is highly satisfactory, despite the extended portion of the operating cycle in which temperatures (normally considered adverse) were provided. It should be noted, however, that when starting temperatures of the order of up to 65° C. are used, that the temperature schedule followed should include an earlier revision downward, as in, for example, Example II or Example IV.

Considerable latitude is permitted in the other variables, the charge to the process and in the several operating conditions. With respect to the catalysts used, for example these are, as already indicated, oil soluble organic peroxides, lauroyl peroxide being preferred. Other catalysts of this character are benzoyl peroxide, acetyl peroxide, acetyl benzoyl peroxide, stearoyl peroxide, caprylyl peroxide, cumene hydroperoxide, tertiary butyl hydroperoxide, di-isopropyl benzene hydroperoxide and para menthane hydroperoxide. The concentration of catalyst used is generally in the range of 0.2 to about 1 percent of the weight of vinyl chloride charged, the particular proportions being affected, in part, by the molecular weight of the specific catalyst. A more preferred catalyst concentration range is from 0.05 to about 0.5 weight percent when lauroyl peroxide is employed.

As already stated, the polymerization is carried out with an effective quantity of a water soluble, hydrophilic colloid, to function, in conjunction with the emulsifying agent, as a process stabilizing and anti-coagulation composition. Although methyl cellulose is a preferred component of this nature, numerous other components can be used with a similar degree of success. Among the readily available materials of this nature are soluble starch, gelatin, agar-agar, sodium alginate and carboxymethyl cellulose. When these materials are substituted for methyl cellulose in the preceding examples, similar results are provided. In the case of methyl cellulose, the preferred proportions are from about 0.05 to 0.15 part per 100 parts of the monomer weight charged, for a water to monomer ratio of 2.25:1. Alternatively stated, the methyl cellulose concentration should be from about 0.01 to 0.25 part per 100 parts of water, or, preferably, from 0.02 to 0.07 part.

Similarly to the permissible variation in the colloid, as above described, considerable latitude is permissible with respect to the emulsifying agent, and, in some instances, the emulsifying agent can be omitted. The emulsifying agent serves the purpose, in conjunction with the colloid, of assuring suspension of the polymer particles in the aqueous system. Accordingly, occasionally it will be advantageous to increase the dosage of hydrophilic colloid and avoid the use of an emulsifier. However, more frequently an emulsifier is highly desirable and salts of sulfoalkylsuccinates are a preferred class of emulsifying, surface-active materials. However, when an equivalent amount of, for example, sorbitan monolaurate, or a polyethylene glycol of sorbitan monolaurate, monopalmitate, or monooleate, or cetyl dimethylbenzyl ammonium chloride, or polyethylene glycol ether of sorbitan monopalmitate, or various condensation products of ethylene glycol and fatty alcohols are substituted for the sodium dioctyl sulfosuccinates in the examples above, similar results are provided. The proportions of the emulsifying agent, in substantially all instances, lies in the range of about 0.1 to about 0.5 part, the preferred range for sodium dioctyl sulfosuccinate being from 0.2 to 0.3 part for a water to monomer ratio of 225:100. Alternatively stated, the sodium dioctyl sulfosuccinate should be in the concentration of about 0.03 to 0.13 part per 100 parts of water in the charge, a preferred concentration range being 0.04 to 0.07 part.

The vinyl chloride monomer employed in the present process should be polymerization grade with, preferably the following specifications:

Acetylene content—less than 5 parts per million
Acetaldehyde content—less than 15 parts per million
Iron content—less than 0.5 part per million
Poly rate test greater than 80 percent conversion in 5 hours The water employed as the polymerization medium should be distilled or deionized, desirably with a minimum specific resistivity of 140,000 ohms at 18° C. In preparing a charge for a batch, the proportions of water should be at least 150 parts of water per 100 parts of vinyl chloride monomer initially introduced. Substantially larger amounts of water can be employed, but such an excess serves no useful purpose. Generally, it is preferred to provide water in the proportions of from 150 to 300 percent of the vinyl chloride of the charge. The proportions emulsifying agent and hydrophilic colloid employed, generally are affected to some extent by the ratio of water in the charge as already indicated. In general, the proportions of these components, as mentioned above relative to the vinyl chloride quantity charged, are appropriate for the usual amounts of water charged.

Having fully described the process of the present invention and the manner of its performance what is claimed is:

1. A suspension process for the polymerization of vinyl chloride comprising forming in a polymerization zone a charge including (a) vinyl chloride monomer, (b) at least 150 parts of water per 100 parts of the monomer initially introduced into said zone, (c) from about 0.2 to about 1 percent of an oil-soluble peroxygen polymerization catalyst, based on the weight of the monomer initially introduced into said zone, and (d) from about 0.1 to 0.5 part of a water-soluble suspension material based on 100 parts of water in the charge; agitating said charge; and imposing upon said charge an initial fixed temperature of about 60° C. for at least about one hour to cause polymerization to occur; then continuing to polymerize said charge while decreasing the temperature upon the charge until the polymerization is at least 75 percent to about 90 percent complete, at which time the temperature of the charge is about 10° C. below the initial polymerization temperature imposed upon the charge.

2. The process of claim 1 wherein the water soluble suspension material includes from about 0.01 to 0.25 part of a water soluble hydrophilic colloid and from about 0.03 to 0.13 part of a water soluble synthetic emulsifying agent, the foregoing proportions being based upon 100 parts of water charged.

References Cited in the file of this patent

UNITED STATES PATENTS

| | | |
|---|---|---|
| 2,259,180 | Schoenfeld et al. | Oct. 14, 1941 |
| 2,395,344 | Schonfeld | Feb. 19, 1946 |
| 2,528,469 | Condo et al. | Oct. 31, 1950 |

FOREIGN PATENTS

| | | |
|---|---|---|
| 609,289 | Great Britain | Sept. 28, 1948 |